Jan. 26, 1932.  W. B. MATHEWSON  1,842,554
WIRE FEEDING DEVICE
Original Filed Jan. 25, 1928    4 Sheets-Sheet 1

Inventor.
Wilfred B. Mathewson
by Heard Smith & Tennant
Attys.

Jan. 26, 1932.  W. B. MATHEWSON  1,842,554
WIRE FEEDING DEVICE
Original Filed Jan. 25, 1928   4 Sheets-Sheet 2

Inventor.
Wilfred B. Mathewson
by Heard Smith & Tennant.
Attys.

Jan. 26, 1932.  W. B. MATHEWSON  1,842,554
WIRE FEEDING DEVICE
Original Filed Jan. 25, 1928   4 Sheets-Sheet 3

Inventor.
Wilfred B. Mathewson
by Heard Smith & Tennant.
Attys.

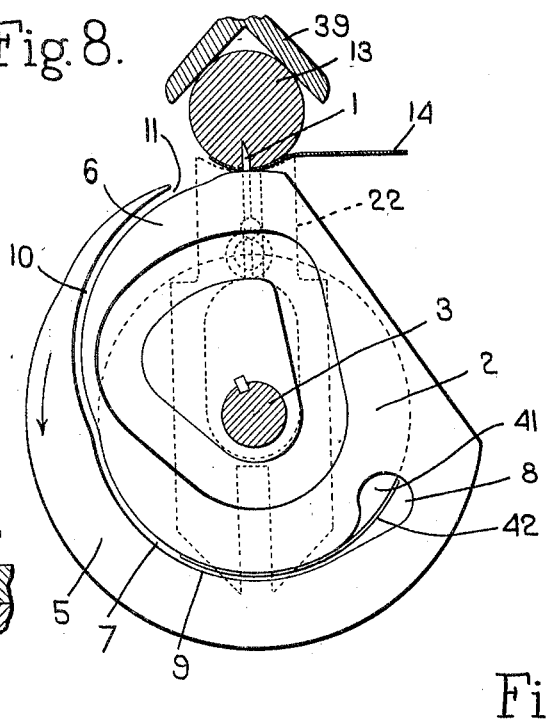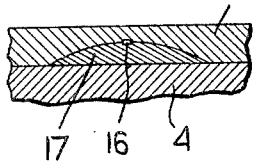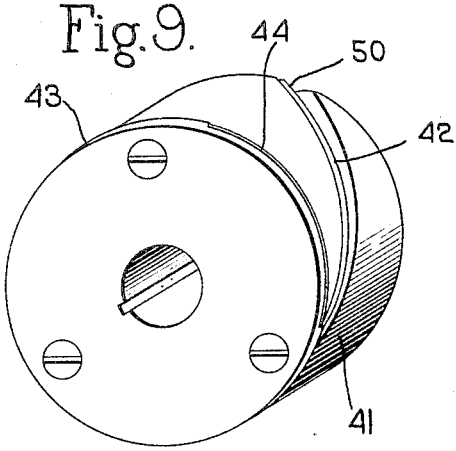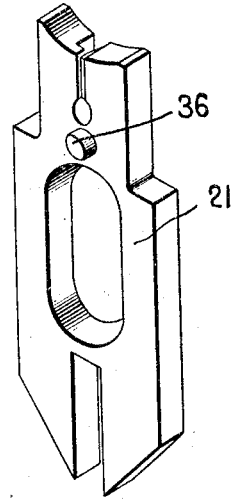

Patented Jan. 26, 1932

1,842,554

UNITED STATES PATENT OFFICE

WILFRED B. MATHEWSON, OF WEYMOUTH, MASSACHUSETTS, ASSIGNOR TO AMERICAN WINDOW SHADE MACHINE CO. INC., OF BOSTON, MASSACHUSETTS, A CORPORATION OF MASSACHUSETTS

WIRE FEEDING DEVICE

Original application filed January 25, 1928, Serial No. 249,281. Patent No. 1,762,450, dated June 10, 1930. Divided and this application filed February 4, 1930. Serial No. 425,809.

This invention relates to a wire-feeding mechanism by which a length of wire may be fed to some machine or other device.

A wire-feeding mechanism embodying my invention is capable of use generally where it is desired to feed a length of wire for one purpose or another and merely as an illustration of one use to which the invention can be put I have shown it herein as applied to a staple-forming machine, that is, a machine which forms a staple from a length of wire. The particular machine or device to which the wire is fed, however, does not form part of the present invention.

My improved wire-feeding mechanism comprises a rotary wire-feeding member which rotates about an axis parallel to the direction in which the wire is fed, said member having a spirally-arranged blade on its periphery which engages the wire and feeds it forward.

This application is a division of application Serial No. 249,281, filed January 25, 1928 which matured into Patent 1,762,450, dated June 10, 1930, and which illustrates and describes a staple-forming and driving mechanism.

In the drawings wherein I have illustrated a selected embodiment of my invention, Fig. 1 is a side view of a staple-forming and driving device such as shown in my above mentioned Patent 1,762,450;

Fig. 8 is a view similar to Fig. 4 but showing the operation of the templet driver in driving the tack or staple;

Fig. 9 is a perspective view of the wire-feeding drum;

Fig. 10 is a sectional view showing the wire-guiding means, said section being taken on substantially the line 10—10, Fig. 3;

Fig. 11 is a perspective view of one of the forming members by which the staple is formed.

Figure 1:
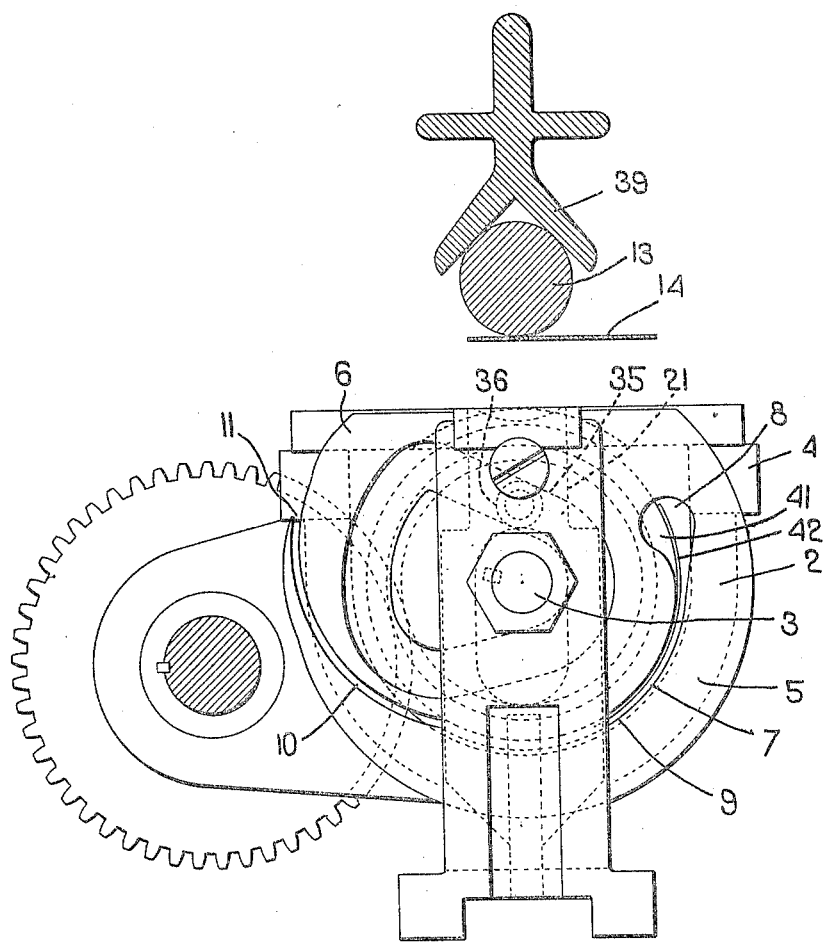
Figure 2:
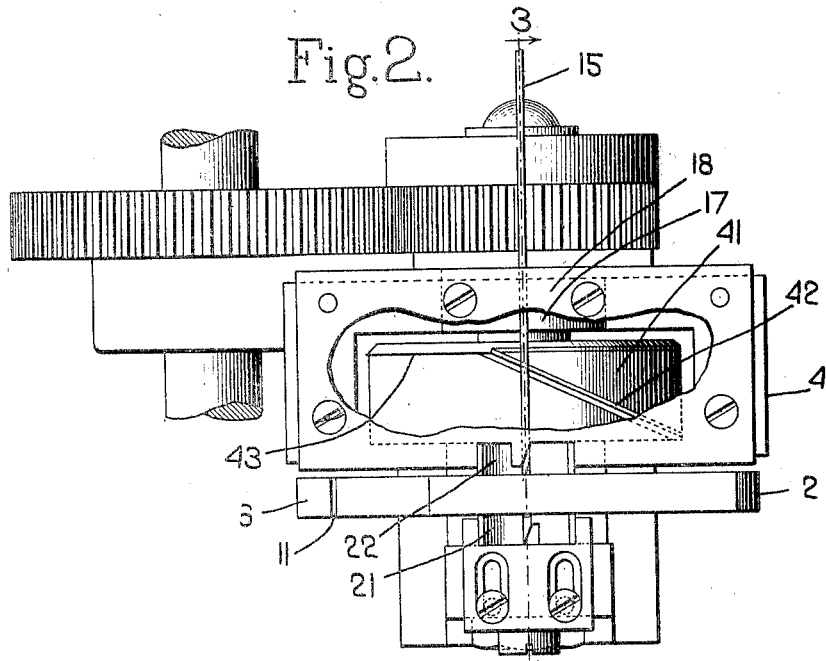
Fig. 2 is a top plan view of the driving device showing my improved wire-feeding mechanism for feeding wire thereto.

In the drawings 15 indicates a length of wire which is to be fed by my improved feeding device, and as stated above, the invention is adapted to feed the wire to a great variety of machines or for a great variety of purposes. In the device herein illustrated, however, the machine to which the wire is fed is one adapted to sever a length from the wire and then to form said length into a staple which is subsequently driven.

The wire-feeding means comprises a wire-feeding drum 41 which is shown as mounted on a shaft 3 that extends parallel to the direction in which the wire is to be fed and may be rotated in any suitable way. This drum has on its periphery a spiral or inclined wire-feeding rib 42 which is provided with a relatively sharp edge 50. Associated with the wire-feeding drum 41 is a wire guide which is formed with a wire-guiding groove or passageway through which the wire passes as it is fed. This wire-guiding groove or passage is shown at 16 and is formed between a supporting member 17 and a cap plate 18, both of which are mounted on the frame 4 by which the operative parts are sustained directly over the drum 41. The wire-guiding passage 16 extends parallel to the shaft of the drum and it holds the wire from movement except in the direction of its length.

The parts are so arranged that as the drum rotates the edge 50 of the wire-feeding rib 42 engages the wire and because of the spiral shape of the rib 42 such engagement will cause the wire to be fed forward through the passage 16 and in a direction substantially parallel to the axis or rotation of the drum.

In the construction shown wherein the rib 42 extends part way around the drum only the wire will have an intermittent feeding motion, it being fed forward during the time that the rib 42 is in engagement therewith and it remaining stationary during the remainder of the rotation of the drum. The length of each forward step depends upon the length of the drum or its dimension in the direction of its axis and, if the wire is being fed intermittently, the time lapsing between successive forward steps would depend upon the pitch of the feeding rib 42 and to what extent it encircles the drum.

Associated with the drum is means to prevent any backward or retrograde movement of the wire when it is not being fed forward by the rib 42. Such means is in the form of a sharp-edged retaining rib 43 which is at one end of the drum and which extends about the portion of the drum not occupied by the feeding rib 42. In other words, the rib 43 is interrupted at 44 for a space equivalent to the peripheral length of the feeding rib 42. When the portion of the drum which does not have the feeding rib 42 thereon is in engagement with the wire then the retaining rib 43 engages the wire and holds it from any retrograde movement. The interruption 44 in the retaining rib 43, however, permits free forward movement of the wire while it is being engaged by the feeding rib 42.

As stated above the wire-feeding device is herein shown as used in connection with a device for forming staples or double-pointed tacks from the wire and then driving such staples. This staple-forming and driving device comprises a templet-driver element 2 which is fast on the shaft 3, and which has a templet portion 5 that constitutes a templet about which the wire is bent to form the staple 1 and a driver portion 6 which acts on the formed staple or tack to drive the latter. This templet-driver member is formed with a slot 7 extending transversely thereto, said slot terminating at its inner end in an opening 8. Said slot has a concentric portion 9 and an eccentric portion 10 which causes the slot to run out at the periphery of the disk as shown at 11.

Figure 3:
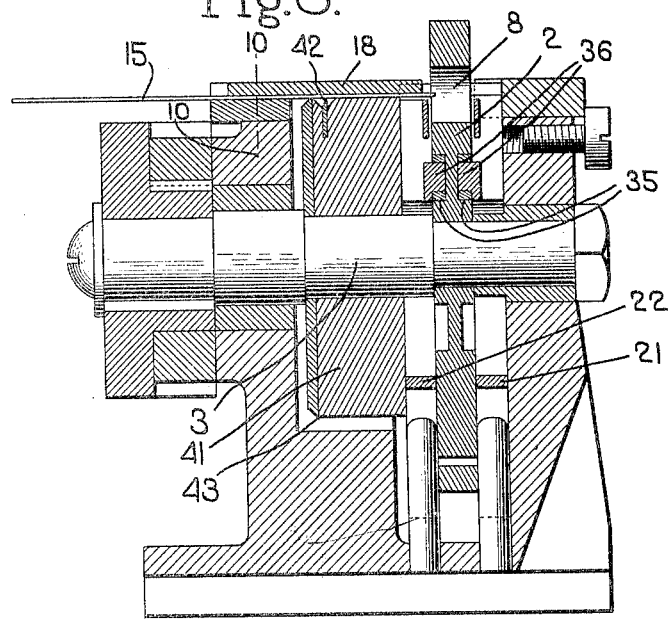
Fig. 3 is a section on the line 3—3, Fig. 2.

Both the templet-driver 2 and drum 41 are fast on the same shaft 3 and at each rotation of the shaft the feeding rib 42 will feed the wire forward and project the wire through the opening 8 as shown in Fig. 3, said figure illustrating the feed of the wire as just beginning.

Figure 4:
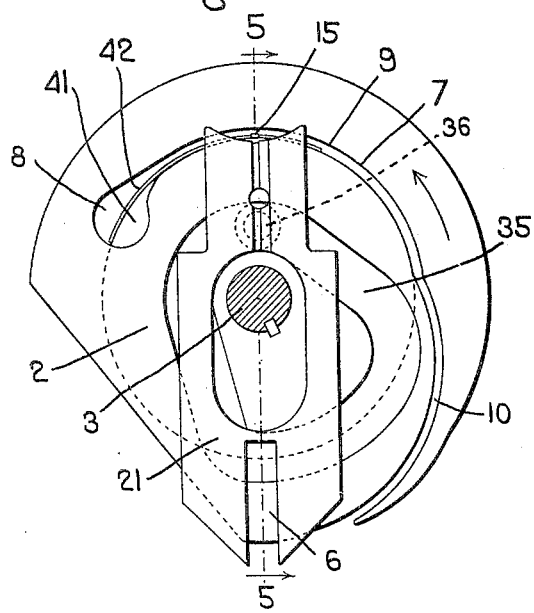
Fig. 4 is a fragmentary view showing the wire being fed to the machine.
Figure 5:
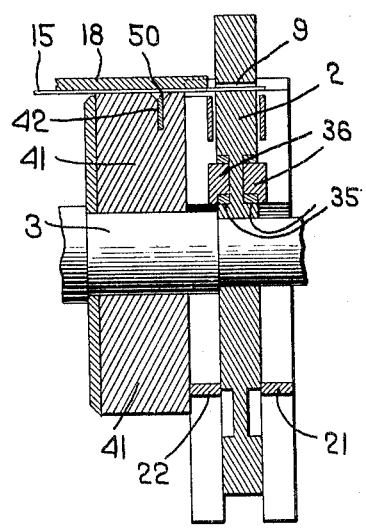
Fig. 5 is a section on the line 5—5, Fig. 4.
Figure 6:
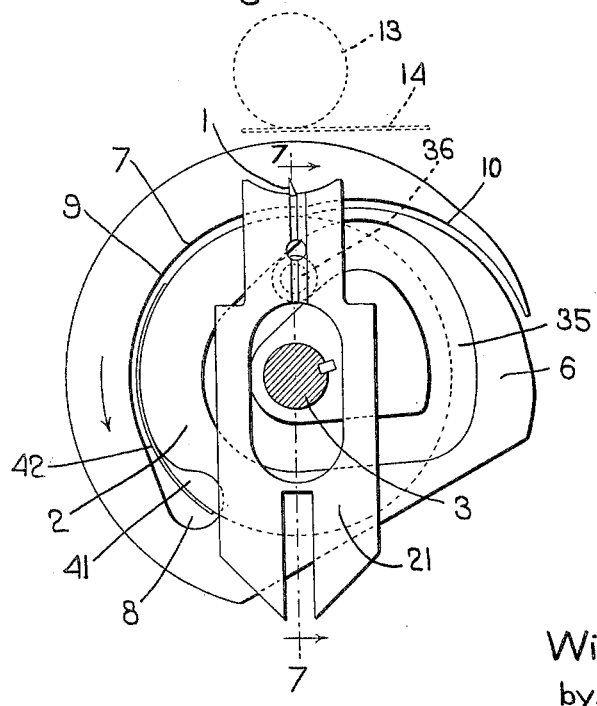
Fig. 6 is a view similar to Fig. 4 showing the parts in a different position.
Figure 7:
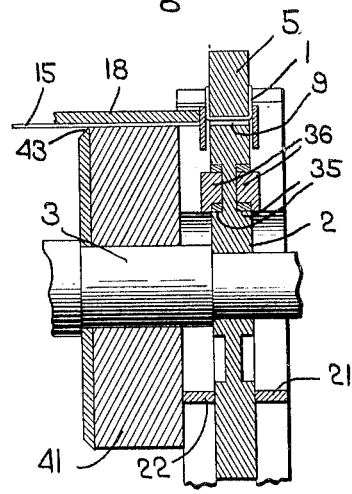
Fig. 7 is a section on the line 7—7, Fig. 6.

Figs. 4 and 5 show the feed of the wire as nearly completed, the wire having been fed through the opening 8 and as the templet driver 2 rotates the wire passes into the concentric portion 9 of the slot 7. When the feed of the wire has been completed then a length is severed from the wire and said length is bent into the staple form 1 as shown in Figs. 6 and 7.

This is accomplished by means of two wire-bending members 21, 22, the member 22 also constituting a cutting member to cut the length of the wire from the wire strip 15. These members 21, 22 are guided vertically in the frame 4 and they give a vertical movement by means of cam grooves 35 formed in the templet-driver member 2, the wire-bending members 21, 22 being provided with followers 36 which engage in the grooves 35. While the wire is being fed into the grooves 29 the wire-bending members 21, 22 are in their lowered position Fig. 5 and when the wire feed has been completed said members are raised into the position shown in Figs. 7 and 8 and during such rising moving, the member 22 cuts the wire and the two members bend the length thus severed about the templet portion 5 of the templet-driver member 2 as shown in Fig. 7 thereby forming the tack or staple. As the templet driver continues to rotate the eccentric portion 10 of the groove 7 engages the staple and forces the staple upwardly and as the driver portion 6 engages the bridge portion of the staple the latter will be driven into an object 13 which may be held in a suitable rest 39. In the particular construction herein illustrated the object 13 is a shade roller to which shade material 14 is being tacked.

Inasmuch as the particular machine to which the wire-feeding device feeds the wire does not form any part of the present invention I have not thought it necessary to further illustrate it herein.

It will be obvious that the device is adapted to feed wire either continuously or intermittently depending upon the shape and character of the feeding rib 42 and that the device is also adapted to feed the wire to any machine and for various purposes.

I claim:

1. A wire feed mechanism comprising a wire-guiding device having a wire-receiving passage through which the wire is fed and a rotary feed member rotatable about an axis parallel to said passage and having a diagonally-arranged sharp-edged feeding rib extending part way only around its periphery, said rib having repeated engagements with the wire as the feed member rotates and operating to feed the wire intermittently.

2. A wire feed mechanism comprising a wire guide having a wire-receiving passage through which wire is fed and a rotary feed member rotatable about an axis parallel to said passage, said feed member having on a limited portion of its periphery wire-feeding means which has repeated engagements with the wire as the feed member rotates and thus feeds the wire intermittently, said feed member having means to engage the wire and prevent it from backward movement when it is not being fed.

3. A wire feed mechanism comprising a wire guide having a wire-receiving passage through which wire is fed, a rotary feed member rotatable about an axis substantially parallel to said passage, said feed member having a diagonally-arranged sharp-edged feeding rib on a portion of its periphery which by engagement with the wire feeds the same through said passage, and also having a sharp-edged retaining rib on the portion of its periphery not occupied by the feeding rib and which prevents backward movement of the wire when it is not being fed by the feeding rib.

4. A wire feed mechanism for a stapling machine having staple-forming and driving means, comprising a rotary feed member having a diagonally-arranged sharp-edged feed rib extending part way only around its periphery and which by engagement with the wire feeds the same intermittently in the general direction of its axis of rotation.

5. A wire feed mechanism for a stapling machine having a staple-forming and driving means, comprising wire-guiding means, a rotary feed member having a diagonally-arranged sharp-edged feed rib extending part way only around its periphery and which by engagement with the wire feeds the same intermittently in the general direction of its axis of rotation.

6. A wire feed mechanism for a stapling machine having staple-forming means comprising a wire guide having a wire receiving passage through which wire is fed, and a rotary feed member rotating about an axis parallel to said passage and having means on its periphery to feed a wire strip through said passage with an intermittent motion.

7. A wire feed mechanism for a stapling machine having staple-forming means comprising a wire guide having a wire-receiving passage through which wire is fed, and a rotary feed member having a diagonally-arranged sharp-edged feed rib on a limited portion of its periphery which by engagement with the wire feeds the same through said passage whereby the wire will be fed forward with an intermittent motion as the feed member is rotated.

8. A wire feed mechanism for a stapling machine having staple-forming means comprising a wire guide having a wire-receiving passage through which wire is fed, and a rotary feed member having a diagonally-arranged sharp-edged feed rib on a limited portion of its periphery which by engagement with the wire feeds the same through said passage, said feed member also having a sharp-edged retaining rib on the remaining portion of its periphery which engages the wire when it is not being fed and prevents it from backward movement.

In testimony whereof, I have signed my name to this specification.

WILFRED B. MATHEWSON.